(12) United States Patent
Schneider et al.

(10) Patent No.: US 10,589,606 B2
(45) Date of Patent: Mar. 17, 2020

(54) WATER COLLECTING TRAY ARRANGEMENT

(71) Applicant: Dr. Ing. h.c. F. Porsche Aktiengesellschaft, Stuttgart (DE)

(72) Inventors: Norbert Schneider, Grossbettlingen (DE); Lena-Marie Mueller, Alsfeld (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 33 days.

(21) Appl. No.: 15/796,908

(22) Filed: Oct. 30, 2017

(65) Prior Publication Data

US 2018/0126831 A1 May 10, 2018

(30) Foreign Application Priority Data

Nov. 8, 2016 (DE) .................. 10 2016 121 303

(51) Int. Cl.
*B60J 7/00* (2006.01)
*B60J 7/20* (2006.01)

(52) U.S. Cl.
CPC ............ *B60J 7/0084* (2013.01); *B60J 7/20* (2013.01)

(58) Field of Classification Search
CPC .......... B60J 7/0084; B60J 7/20; B60R 13/07; B62D 25/07; B62D 25/081
USPC .................................... 296/38, 192
See application file for complete search history.

(56) References Cited

U.S. PATENT DOCUMENTS

| 5,509,712 A * | 4/1996 | Rausch .................. B60J 7/20 296/124 |
| 5,527,081 A * | 6/1996 | Rausch .................. B60J 7/0084 296/124 |
| 9,139,231 B2 | 9/2015 | Lacroix |
| 9,435,453 B1 * | 9/2016 | Shen .................. F16K 15/147 |
| 2010/0194138 A1 | 8/2010 | Matthes |
| 2011/0017116 A1 * | 1/2011 | Thompson .......... B60J 7/0084 114/182 |
| 2011/0254321 A1 * | 10/2011 | Moral .................. B62D 25/07 296/213 |
| 2017/0158035 A1 * | 6/2017 | Lafleur-Hunker ..... B60J 7/0084 |

FOREIGN PATENT DOCUMENTS

| DE | 297 11 482 | 10/1997 |
| DE | 10 2005 011 479 | 9/2006 |
| DE | 10 2012 020 861 | 4/2014 |
| EP | 2 125 436 | 10/2011 |
| WO | 2008/138366 | 11/2008 |

OTHER PUBLICATIONS

German Search Report dated Jul. 6, 2017.

* cited by examiner

*Primary Examiner* — Jason S Daniels
(74) *Attorney, Agent, or Firm* — Gerald E. Hespos; Michael J. Porco; Matthew T. Hespos

(57) ABSTRACT

A water collecting arrangement (2) for a motor vehicle has a water tray (10) with a water tray base (14) and an encircling water tray wall (16) extending up from the water tray base (14). At least one water outlet (12) is arranged on the water tray base (14). The at least one water outlet (12) has a dam collar (20; 20'; 20") raised from the water tray base (14) and radially surrounding a water outlet opening (26).

4 Claims, 4 Drawing Sheets

WATER COLLECTING TRAY ARRANGEMENT

CROSS REFERENCE TO RELATED APPLICATION

This application claims priority under 35 USC 119 to German Patent Appl. No. 10 2016 121 303.9 filed on Nov. 8, 2016, the entire disclosure of which is incorporated herein by reference.

BACKGROUND

Field of the Invention. The invention relates to a water collecting tray arrangement for a motor vehicle.

Description of the Related Art. A water collecting tray is a part of a water management system that allows defined drainage of the water from the external skin of the motor vehicle and thereby prevents water penetration into the interior of the vehicle. Convertibles have water management systems of this kind since a movable convertible top has to be sealed relative to rigid body components. A water collecting tray that is not visible from the outside may adjoin an edge gap between a convertible top and a rigid body component may in the rear area of the motor vehicle to ensure that the water draining from the vehicle roof flows via the edge gap into the water collecting tray. The water is collected in the water collecting tray and is guided out of the vehicle body at a defined point and drains away.

WO 2008/138366 A1 discloses a convertible having a water collecting tray arrangement with a water collecting tray arranged in a convertible top compartment in the rear area of the convertible and extends over almost the entire width of the motor vehicle. At its open end, the water collecting tray is of funnel-shape and is oriented toward an edge gap between a convertible top compartment cover and the convertible top to ensure that the water entering the convertible top compartment via the edge gap flows into the water collecting tray. At the opposite end, the water collecting tray has a water outlet stub, to which it is possible to connect a drain hose for carrying the water out of the vehicle body selectively at a defined point.

The disadvantage with a water collecting tray arrangement of this kind is that dirt particles also enter the water collecting tray together with the water, and these dirt particles can block the water outlet or the drain hose connected to the water outlet stub, ultimately causing the water collecting tray to overflow.

It is therefore the object of the invention to provide a water collecting tray that avoids the abovementioned disadvantages in a simple and low-cost way.

SUMMARY

The invention relates to a water collecting tray arrangement that has a water collecting tray that may be made of plastic for and that may be arranged generally in the front or rear area of a motor vehicle. The water collecting tray has a water tray base, an encircling water tray wall and a water outlet opening in the water tray base through which the water collected in the water collecting tray drains away.

A dam collar may surround the water outlet opening and extends up from the water tray base thereby causing the water to build up in the water collecting tray. The buildup of the water has the effect that the water flow is calmed so that dirt particles carried along in the water are sedimented. The water is built up until the water level exceeds the height of the dam collar and the water drains away through the water outlet opening. The height and shape of the dam collar depend on the geometry of the water collecting tray and on the quantity of water to be built up.

In this way, it is possible to provide a water collecting tray arrangement that prevents the entry of dirt particles into the water outlet and prevents blockage of the water outlet opening in a simple and low-cost way.

The outer surface of the dam collar may be frustoconical with the diameter at the bottom of the dam collar exceeding the diameter at the top of the dam collar. As a result, the outer surface of the dam collar encloses an angle $a>50°$ with the vertical. The frustoconical configuration of the outer surface of the dam collar causes the water flowing into the water collecting tray to build up without causing new eddies due to abrupt deceleration of the water when overflowing and thereby stirring up the dirt particles that have already settled on the water tray base.

The dam collar may be a separate component, wherein the water outlet opening is formed by the separate component. The separate component may have a frustoconical portion and a cylindrical portion adjoining the frustoconical portion. The bottom of the frustoconical portion may rest on the water tray base. The cylindrical portion may adjoin the bottom of the frustoconical portion and may pass through the water tray base. In this way, the separate component is supported radially and at least in one axial direction. Alternatively, the separate component can have just a frustoconical portion and can be bonded adhesively to the water tray base.

An encircling seal may be arranged between the separate component and the water tray base, thereby sealing the gap between the water tray base and the separate component. The seal can be a sealing ring arranged in an annular groove formed in a circumferential surface of the separate component or the water collecting tray. As an alternative, the separate component can be connected to the water tray base by an adhesive that seals the gap between the separate component and the water tray base.

The dam collar and the water tray base may be of one-piece or integral design, with the dam collar produced during the process of producing the water collecting tray itself. As a result, the outlay on production and assembly is reduced.

The water tray base may have a depression that completely surrounds the water outlet opening, and only the inner wall of the depression forms the continuous and annular dam collar. The depression can be an annular depression, for example, and the inner wall of the depression may enclose an angle greater than 45° with the horizontal.

A drain hose may be connected to the water outlet. As a result, the water can be guided out of the vehicle body at a defined point.

The dam collar may be formed by the drain hose. In this case, the free upper end of the drain hose passes through the water tray base and projects above the water tray base to form the dam collar. A dam collar is thus formed in a simple and low-cost way, with no additional components or manufacturing and assembly steps required. The gap between the outer circumferential surface of the drain hose and the water tray base can be sealed off by a seal element arranged on the water tray base or on the outer circumferential surface of the drain hose.

DETAILED DESCRIPTION

Figure 1:
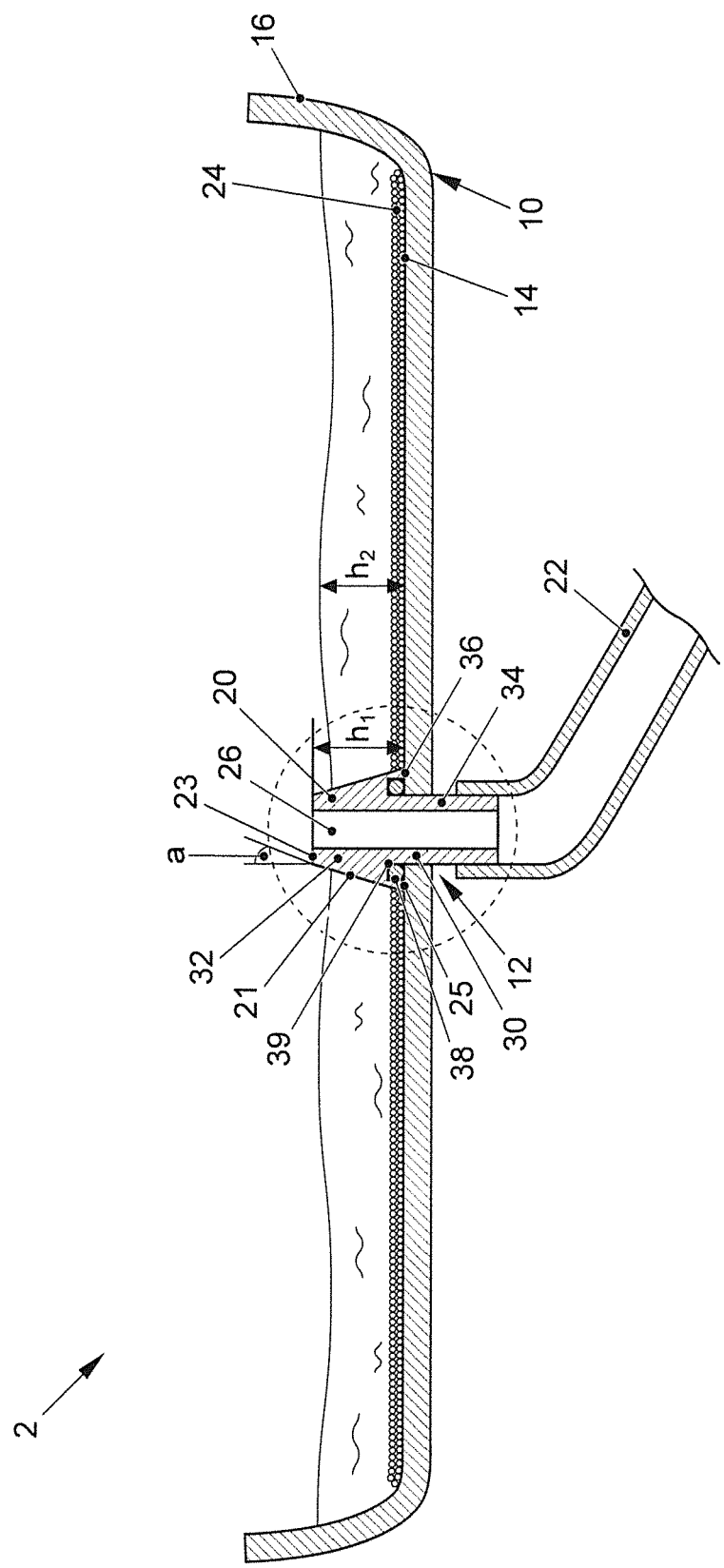
FIG. 1 is a section through a water collecting tray arrangement having a first embodiment of a collar

FIG. 1 shows a section through a water collecting tray arrangement 2 having a water collecting tray 10 that is composed of a water tray base 14 and a water collecting tray side wall 16. The water tray base 14 has a water outlet 12 through which the water can drain out of the water collecting tray 10. This embodiment of the water collecting tray 10 is identical for all embodiments in FIGS. 1 to 4.

The water outlet 12 has a water outlet opening 26 and a dam collar 20 surrounding the water outlet opening 26 and raised from the water tray base 14. The configuration of the dam collar 20 depends on the geometry of the water collecting tray 10, the inflowing quantity of water and the water inflow rate to be expected. In this case, the position of the dam collar 20 in the water collecting tray 10, the height h1 of the dam collar 20 above the water tray base 14 and an angle a can be varied. The angle a is enclosed between an outer surface 21 of the dam collar 20 and a vertical. The outer surface 21 extends between a top 23 and bottom 25 and a top 23 of the dam collar 20. In the present case, the angle a is 25°.

The dam collar 20 illustrated in FIG. 1 is formed by a separate component 30 that has a frustoconical portion 32 and a cylindrical portion 34. The frustoconical portion 32 forms the dam collar 20 and has a bottom surface 36 that rest on the water tray base 14. The bottom surface 36 has an encircling annular groove 39, and an annular seal 38 is arranged in the groove 39. The seal element 38 seals off a gap formed between the separate component 30 and the water tray base 14. As an alternative, the annular groove and the seal element can be formed or arranged on the water tray base 14.

The cylindrical portion 34 adjoins the bottom surface 36 of the frustoconical portion 32 and projects through the water tray base 14 and down out of the water tray base 14. The free end of the cylindrical portion 34 opens into a drain hose 22 that is secured on the outer surface of the cylindrical portion 34.

The water collecting tray arrangement 2 could be arranged in the rear area of a motor vehicle. Thus, water flowing down from the vehicle roof flows into the water collecting tray arrangement 2 and is carried out of the vehicle body from there in a defined manner. During this process, the water flowing into the water collecting tray 10 carries dirt particles 24 into the water collecting tray 10. The water is built up in the water collecting tray 10 by the dam collar 20. Thus, the water is calmed and the dirt particles 24 settle out as sediment on the water tray base 14. Accordingly, the dirt particles do not block the water outlet 12 or the drain hose 22. The dirt particles 24 that settle on the water tray base 14 can be removed from the water collecting tray 10 during servicing of the water collecting tray arrangement 2. The water is built up until the water level h2 reaches the height h1 of the dam collar 20 and the water free of dirt particles can drain away through the water outlet opening 26.

Figure 2:
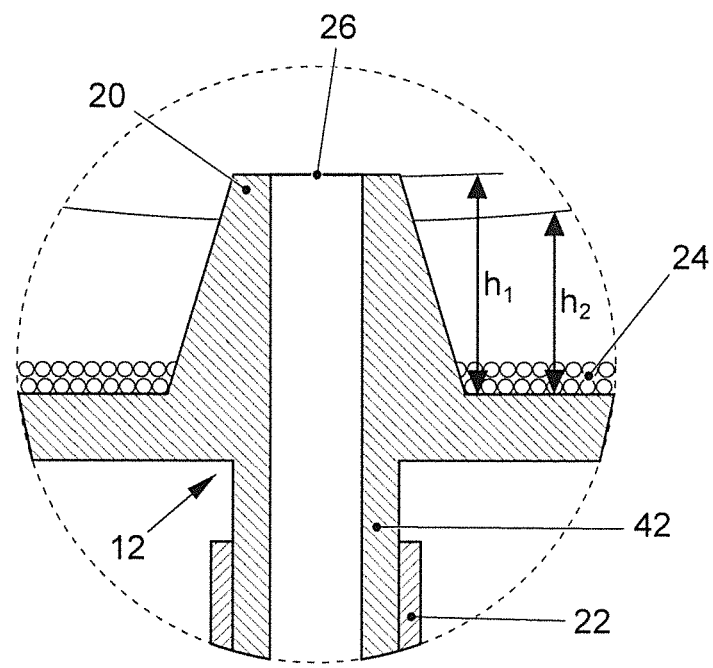
FIG. 2 is a section through a detail of a water collecting tray arrangement having a second embodiment of a collar.

FIG. 2 shows a detail of a water collecting tray arrangement 2 having a second embodiment of the dam collar 20. The dam collar 20 is of one-piece design with the water tray base 14 and is of frustoconical design. The water tray base 14 has a cylindrical portion 42 at the vertically opposite end from the dam collar 20 and the drain hose 22 is connected to the water outlet 12 at the cylindrical portion 42.

Figure 3:
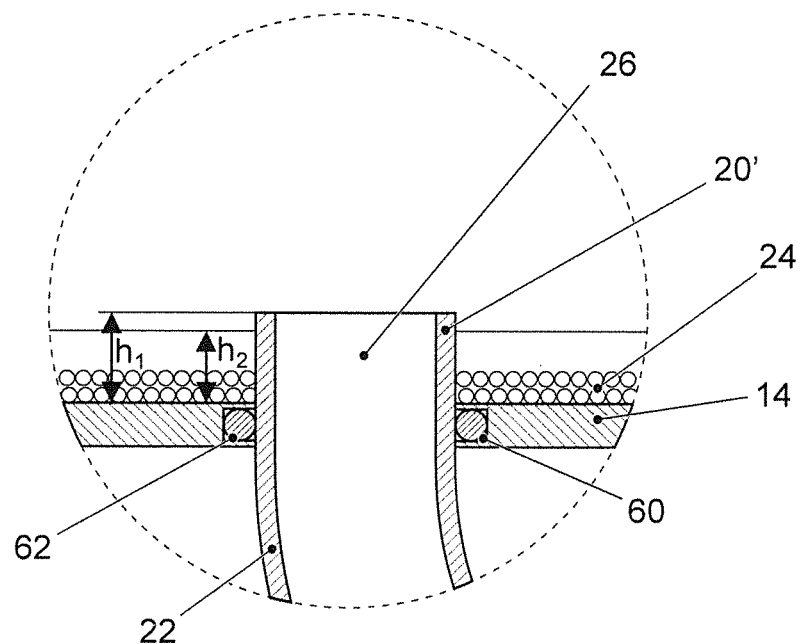
FIG. 3 is a section through a detail of the water collecting tray arrangement having a third embodiment of a collar.
Figure 4:
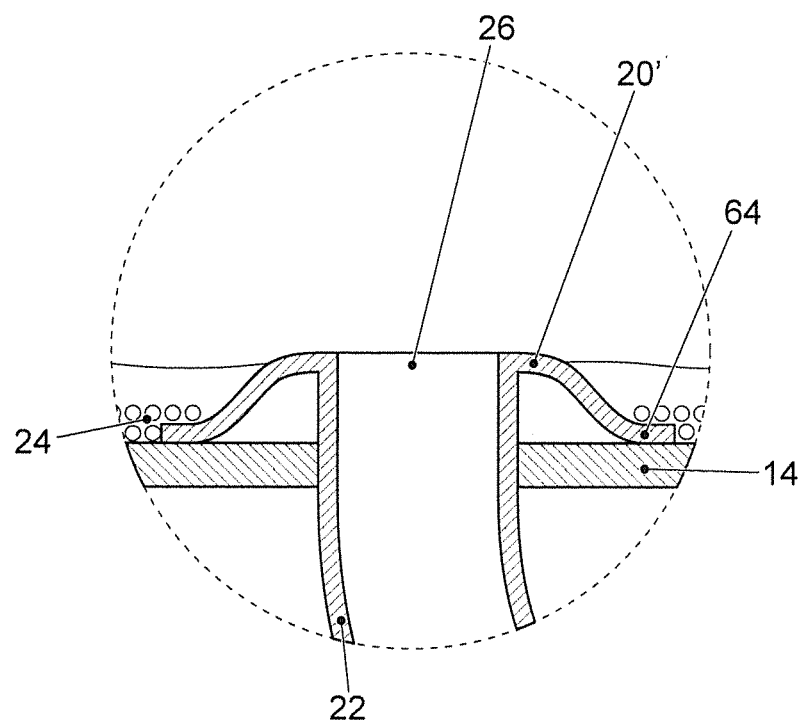
FIG. 4 is a section through a detail of the water collecting tray arrangement having a fourth embodiment of a collar.

FIGS. 3 and 4 show a detail of a water collecting tray arrangement 2 having a third and fourth embodiment of the dam collar 20'. In this case, the drain hose 22 forms the dam collar 20'. More particularly, the drain hose 22 projects up beyond the water tray base 14 and thereby forms the dam collar 20'. In the third embodiment, the water tray base 14 has an encircling annular groove 60, in which an annular seal element 62 is seated and seals off the gap between the water tray base 14 and the outer circumferential surface of the drain hose 22. In the fourth embodiment, the drain hose 22 has an integrally formed sealing lip 64 that extends radially out from the lateral surface of the dam collar 20' and rests by means of an outer circumferential rim on the water tray base 14. In this way, the gap between the water tray base 14 and the drain hose 22 is sealed off.

Figure 5:
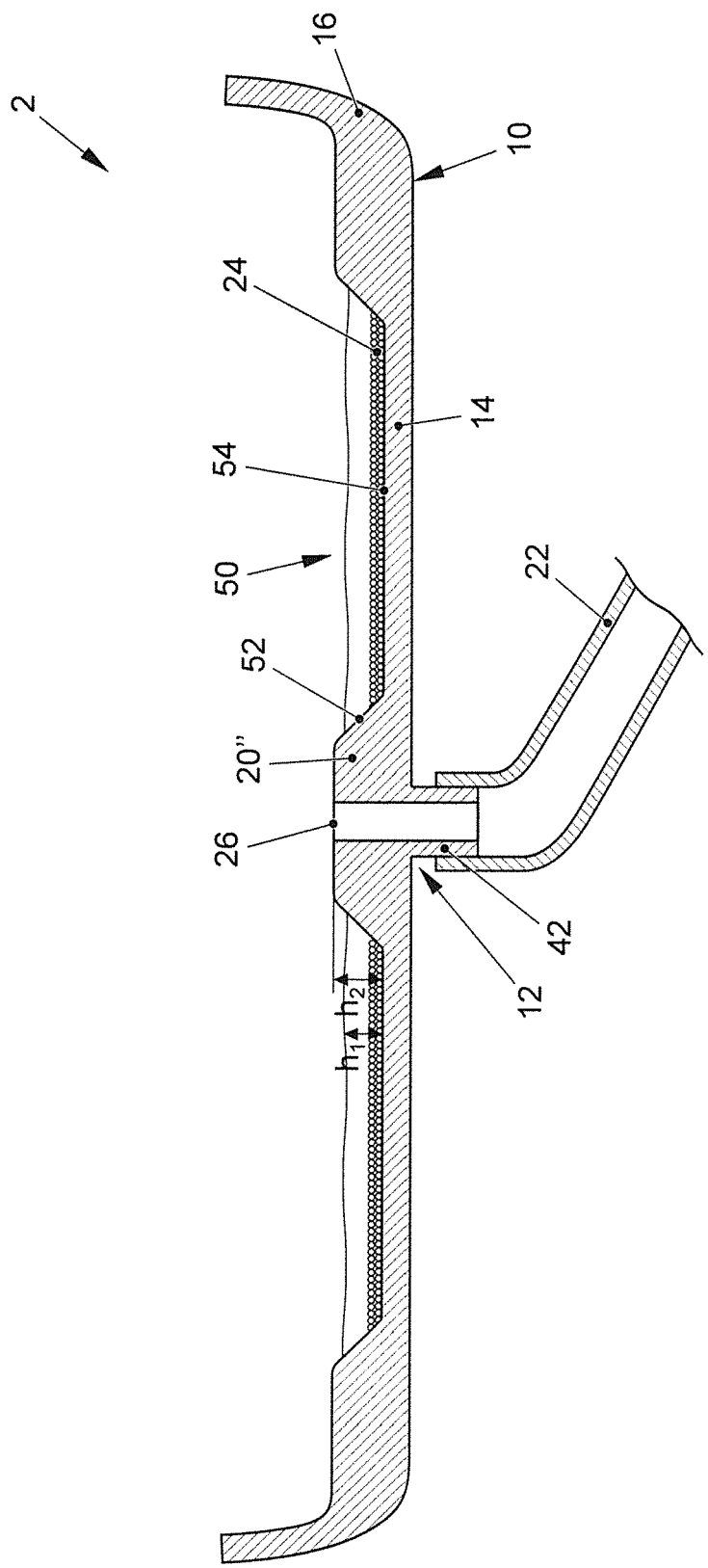
FIG. 5 shows a section through the water collecting tray arrangement having a fifth embodiment of a collar.

FIG. 5 shows a water collecting tray arrangement 2 with a fifth embodiment of the dam collar 20". The water tray base 14 has a depression 50 with an inner wall 52 and a depression base 54. The depression 50 can be ring-like and can extend over 360° or be of only segmental design. The dam collar 20" is formed by the inner wall 52 so that the dirt particles 24 settle on the base depression as sediment. As in the embodiment shown in FIG. 2, the water tray base 14 has the cylindrical portion 42, on which the drain hose 22 is secured.

Design embodiments other than the embodiments described that fall within the scope of protection of the main claim also are possible. For example, the shape of the collar 20, the shape of the water collecting tray 10 or the seal elements 38, 62 can be embodied in a different way.

What is claimed is:

1. A water collecting arrangement for a motor vehicle, comprising a water tray having a base and an encircling water wall extending up from the base, and at least one water outlet arranged on the water tray base, the at least one water outlet having a dam collar formed by a component separate from the water tray and raised from the base and radially surrounding a water outlet opening, the dam collar defining a frustoconical wall extending continuously around the water outlet at a specified height from the water tray base and configured so that an outer diameter of the dam wall decreases at farther distances from the water tray base, and an encircling seal retained in an annular groove formed in one of the separate component and the base and arranged between the separate component and the base for sealing any gap between the separate component and the base and ensuring that water exits the water tray only from an end of the dam collar remote from the base of the water tray.

2. The water collecting arrangement of claim 1, further comprising a drain hose into which the water outlet opens.

3. A water collecting arrangement for a motor vehicle, comprising a water tray having a base and an encircling water wall extending up from the base, and at least one water outlet arranged on the water tray base, the at least one water outlet having a dam collar raised from the base and radially surrounding a water outlet opening, wherein the base has a depression with an inner wall and the dam collar is defined by the inner wall of the depression formed in the base.

4. The water collecting arrangement of claim 3, wherein the dam collar and the base are integral with one another to define a one piece component.

\* \* \* \* \*